Patented Sept. 14, 1926.

1,599,508

UNITED STATES PATENT OFFICE.

JEAN ALTWEGG AND CHARLES ANTOINE MAILLARD, OF LYON, FRANCE, ASSIGNORS TO SOCIETE CHIMIQUE DES USINES DU RHONE, OF PARIS, FRANCE.

PURIFICATION OF CELLULOSE ETHERS.

No Drawing. Application filed October 20, 1925, Serial No. 63,753, and in France December 22, 1924.

The cellulose ethers produced by known methods, by means of industrial apparatus have usually been obtained in the form of masses more or less coloured. The solutions of these crude ethers in the suitable solvents exhibit the same colorations, as well as varnishes, films, filaments, etc. obtained with these ethers as crude materials.

It is therefore necessary to submit the crude ethers to a purifying and a bleaching treatment, so as to render them suitable for use in the manufacture of colourless varnishes and objects of various nature.

Several methods of purification of crude ethers have already been proposed. In most methods, the ether is dissolved in a suitable solvent and is re-precipitated by a liquid which is mixable with the solvent but which is not a solvent of the ether to be purified. In this manner it is possible to somewhat attenuate the initial colour of the crude ether, but absolute colourlessness is not reached, however, even when these operations are repeated a large number of times. A portion of the impurities is always retained by the principal ether.

It has also been proposed to wash the ethers, when in the solid state, with dilute acids, particularly with dilute nitric acid. The latter process does not, however, yield colourless ether, any more than the former.

The purification method, object of the present invention is based on the action of strong acids upon the crude ethers in solution, as revealed by the observation that a solution of crude ethers in a suitable solvent becomes gradually colourless after the addition of a certain quantity of strong acid. By precipitation, a white purified ether is obtained which, when re-dissolved, gives colourless solutions. As solvent liquid, acetic acid or any other suitable solvent, or mixtures of solvents, may be used. The strong acids which may be used for this purification are numerous. Foremost can be mentioned sulphuric and hydrochloric acids, then nitric and phosphoric and other acids.

In carrying out this new process in practice a definite quantity of strong acid is added to the solution of crude ether, and after allowing it to react for a certain length of time, the ether is re-precipitated by means of a non-solvent liquid.

The quantity of strong acid to be employed can vary in relatively wide limits. The use of too large quantities which in certain cases, could alter more or less deeply the ethers, is to be avoided. The same caution must be observed respecting the duration of the action of the acid, which duration may vary from a few minutes to several hours.

Generally the operation can be performed quite satisfactorily at ordinary temperature, but heat may be applied, provided that the reaction temperature selected is not such as to be a source of danger.

By selecting working conditions such as those indicated in the following example, no degradation of the cellulose ether molecule is to be feared.

*Example I.*—15 c. cms. of hydrochloric acid at 8° Bé. are poured in a litre of acetic solution containing 100 grammes of crude ethyl-cellulose, obtained by the action of ethyl-chloride on sodium cellulose in a steel autoclave. After thoroughly mixing, the mixture is allowed to stand for 30 minutes at ordinary temperature. The ethyl-cellulose ether is obtained, by precipitation in a large quantity of water, under the form of a white mass which, washed and dried, constitutes a valuable raw material for the manufacture of varnishes, collodions, celluloids, films, threads, or fabrics.

*Example II.*—50 parts of crude ethyl cellulose containing about 40% of ethoxyl groups are dissolved in 500 parts of alcohol at 93°, and 15 parts of sulphuric acid 35° Bé. are added with stirring. After standing for one hour at a temperature of 20 to 25° C. the mixture is poured in water and filtered, and the purified ether is washed and dried.

*Example III.*—By replacing in Example I the crude ethyl-cellulose by a crude methyl-cellulose obtained by the action of the methyl sulphate on sodium cellulose, a methylic ether of great purity is obtained.

What we claim and desire to secure by Letters Patent is:—

1. A process of purification of cellulose ethers consisting in causing a small quantity of a strong acid to react on a solution of the crude cellulose ether and in precipitating by a liquid mixable with the solvent, but not being a solvent of the ether to be purified.

2. A process of purification of cellulose ethers consisting in causing a small quantity of hydrochloric acid to react on a solution of the crude cellulose ether, and in precipitating by a liquid mixable with the solvent, but not being a solvent of the ether to be purified.

3. A process of purification of crude ethyl-cellulose consisting in forming an alcoholic solution of the cellulose ether, adding hydrochloric acid with stirring and reprecipitating with water.

4. The process of purifying crude ethyl-cellulose, which consists in forming an alcoholic solution of the cellulose ether and adding thereto hydrochloric acid, the acid and solution being in the approximate proportions by weight of one and forty respectively, stirring the mixture and re-precipitating with water.

In testimony whereof we have signed our names to this specification.

JEAN ALTWEGG.
CHARLES ANTOINE MAILLARD.